US012605915B2

(12) United States Patent
De Luca

(10) Patent No.: US 12,605,915 B2
(45) **Date of Patent: *Apr. 21, 2026**

(54) METHOD AND SYSTEM FOR FORMING DOMED PAPER AND STRUCTURES

(71) Applicant: Little Feet Packaging, Inc., Wilmington, DE (US)

(72) Inventor: Nicholas P. De Luca, San Francisco, CA (US)

(73) Assignee: Little Feet Packaging, Inc., Wilmington, DE (US)

(*) Notice: Subject to any disclaimer, the term of this patent is extended or adjusted under 35 U.S.C. 154(b) by 53 days.

This patent is subject to a terminal disclaimer.

(21) Appl. No.: 18/477,131

(22) PCT Filed: May 15, 2022

(86) PCT No.: PCT/US2022/072333

§ 371 (c)(1),
(2) Date: Dec. 7, 2023

(87) PCT Pub. No.: WO2022/246379

PCT Pub. Date: Nov. 24, 2022

(65) Prior Publication Data

US 2024/0367405 A1 Nov. 7, 2024

Related U.S. Application Data

(63) Continuation of application No. 17/377,008, filed on Jul. 15, 2021, now Pat. No. 11,602,916.

(Continued)

(51) Int. Cl.
*B31D 5/00* (2017.01)

(52) U.S. Cl.
CPC .......... *B31D 5/006* (2013.01); *B31D 5/0073* (2013.01); *B31D 2205/0023* (2013.01); *B31D 2205/0058* (2013.01); *B31D 2205/0064* (2013.01)

(58) Field of Classification Search
CPC ................. B31D 5/006; B31D 5/0073; B31D 2205/0023; B31D 2205/007; B31D 2205/0064; B31D 2205/0058
See application file for complete search history.

(56) References Cited

U.S. PATENT DOCUMENTS

| | | | | |
|---|---|---|---|---|
| 4,442,252 A * | 4/1984 | Sumi | ..................... | D21H 27/40 524/183 |
| 5,454,642 A | 10/1995 | De Luca | | |

(Continued)

FOREIGN PATENT DOCUMENTS

| | | |
|---|---|---|
| EP | 2406337 A1 | 1/2012 |
| EP | 2754553 B1 | 1/2020 |

(Continued)

OTHER PUBLICATIONS

International search report for PCT/US2022/072333.

*Primary Examiner* — Thomas M Wittenschlaeger
(74) *Attorney, Agent, or Firm* — Capitol City TechLaw; Jasbir Singh

(57) ABSTRACT

A method and system for forming domes or protruded structures in a flat material such as paper is disclosed. The method includes cutting one or more sheets; applying an adhesive between the one or more sheets, joining the one or more sheets together in a registered manner to form a substrate, and pressing the adhesive under pressure to shape the substrate into a desired shape may include the domes or protruded structures.

19 Claims, 10 Drawing Sheets

Related U.S. Application Data

(60) Provisional application No. 63/189,211, filed on May 16, 2021.

(56) References Cited

U.S. PATENT DOCUMENTS

| | | | | |
|---|---|---|---|---|
| 5,980,673 | A | 11/1999 | Takeuchi et al. | |
| 6,116,000 | A | 9/2000 | Perkins et al. | |
| 6,926,947 | B1 | 8/2005 | Seckel | |
| 7,469,783 | B2 | 12/2008 | Rose | |
| 7,807,253 | B2 | 10/2010 | Kannankeril | |
| 9,315,312 | B2 | 4/2016 | Luca et al. | |
| 10,870,949 | B2 | 12/2020 | Luca | |
| 11,602,916 | B2 * | 3/2023 | De Luca | B31D 5/006 |
| 2005/0044813 | A1 | 3/2005 | Noorian | |
| 2012/0264581 | A1 * | 10/2012 | Babinsky | B65D 81/3874 493/112 |
| 2013/0171422 | A1 * | 7/2013 | De Luca | B32B 3/266 428/172 |
| 2021/0061535 | A1 | 3/2021 | Moore et al. | |
| 2021/0122504 | A1 | 4/2021 | De Luca | |
| 2022/0080696 | A1 * | 3/2022 | Kiessner | B31F 1/285 |

FOREIGN PATENT DOCUMENTS

| | | | |
|---|---|---|---|
| JP | 2007092192 | A | 4/2007 |
| KR | 101053277 | B1 | 8/2011 |

* cited by examiner

METHOD AND SYSTEM FOR FORMING DOMED PAPER AND STRUCTURES

CROSS-REFERENCE TO RELATED APPLICATIONS AND INCORPORATION BY REFERENCE

The present application is a continuation of International Application No. PCT/US2022/072333, filed 15 May 2022, which is a continuation of U.S. application Ser. No. 17/377,008, filed 15 Jul. 2021 (now issued as U.S. Pat. No. 11,602,916), which claims the benefit of U.S. Provisional Application No. 63/189,211, filed 16 May 2021, which are all incorporated herein by reference in their entireties.

FIELD

The present disclosure teaches a system and method for making domed paper for use in applications such as packaging or envelopes.

The method incorporating those elements already described in the co-pending applications but further including means for dividing the manufacturing process so as to allow for the formation of the domed paper at a different location or at a different time than the first step of adhesive application and die cutting and further not requiring additional solvent to moisten or form the domes.

BACKGROUND

Void fill paper cushioning, cushioning wrap, and envelopes with liners are commonly used for the purpose of mailing and shipping packages. In U.S. Pat. No. 5,454,642 ("Inflatable flat bag packaging cushion and methods of operating and making the same") and U.S. Pat. No. 6,116,000 ("Method of and apparatus for manufacturing air-filled sheet plastic and the like") De Luca describes various methods for integrating air cushioning products with boxes or envelopes. In U.S. Pat. No. 9,315,312 ("Domed Multilayer Cushioning Article") and U.S. Pat. No. 10,870,949 ("Manufacturing Process for Forming Domed Paper", De Luca describes a paper dome cushioning product that can be formed and integrated within an envelope. In US Patent Pub. No. 2021/0122504 ("Automated System for Integration of a Liner and Envelope") De Luca describes a system for forming mailers and further filling said mailers.

In all these systems, the formation of the domed paper occurs at the same time as the application of the adhesive or of a solvent such as water that is used in order to dissolve an attached adhesive and create the dome. Inherently, the use of an auxiliary material such as water or adhesive requires equipment such as misters, rollers, or spray valves which are expensive and difficult to operate. Further, the application of adhesive is a sensitive operation that requires very controlled process that account for the viscosity of the adhesive changing with temperature and humidity as well as the dynamics of moving materials as high speeds.

Many distribution facilities including those for e-commerce are set-up with pack stations that are individually manned and to which items to-be-shipped are delivered directly to and further packed. Such workstations require just-in-time production of a packaging materials such as inflated void fill or cushioning wrap or crumpled paper. Due to the high volume of goods being shipped at these kinds of facilities, the use of packaging material that are already domed or filled with air at the work stations is not practical as in lower volume settings. Machine systems used at the pack stations are preferably small, simple and inexpensive, and, as such, an all electrical system that does not require pneumatics or other materials to work such as water or adhesive is preferred.

Shipping material with a high void content or air content distances greater than 100 miles is expensive due to the high volume and as such, compressed materials that can be formed or expanded at the location of use are required.

Formation of the domed paper as a secondary step is also difficult because the registration of the pressing die and the paper is critical in order to form a consistent domed sheet. This is further complicated if the forming is done on a system that is not registered to the cutting die of a formed sheet.

The formation of items at a distribution facility using machinery that integrates a domed paper such as padded mailers or lined boxes is also preferably accomplished using a simpler machine that does not require adhesive or solvent sprayers.

The selection of the correct adhesive to form domes per U.S. Pat. No. 9,315,312 is important to insure the correct strength of the dome after formation. Adhesives commonly used in the formation of envelopes and boxes are water soluble and can be removed or integrated in the recycling process of paper. The absorption rate of the adhesive within the paper as a function of time and the rate of curing of the adhesive with exposure to air, temperature, and heat is very important to insure a reliable finished product. Many of these adhesives though have a high water content that makes them difficult to use if allowed to remain on the paper for long periods prior to forming the dome as the water and adhesive absorb within the paper matrix of the paper.

It is therefore a primary objective of the following invention to provide a consistent manufacturing method able to form domes per U.S. Pat. No. 9,315,312 in at least two discrete steps that separate the method of forming the domes from the method of forming the substrate.

It is an objective of the invention that the equipment and the segmented method of forming the domes does not require the use of adhesive or solvent and as such does not require the use of rollers or sprays.

It is another object of the current invention to allow for the formation of the domed paper as a two-step machinery process wherein the forming of the domes on the flat substrate occurs at substantially different location.

It is also an object of the current invention that the domed paper product produced is of the same integrity and strength as that required for shipping items.

It is a further object of the current invention that the method of making the domed paper allow for the paper to be compostable and recyclable.

It is a further objective of the following invention that the equipment for making the domes be capable of operating completely on electrical power.

It is further an objective of the following invention that the method of forming the domes be accomplished in such a way that allows for registration of the press and the cut paper domes on the substrate.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a novel method for forming paper or other material with domes or protrusions.

An objective of the present teachings is to provide a consistent manufacturing method able to form domes per U.S. Pat. No. 9,315,312 in at least two discrete steps that separate the method of forming the domes from the method of forming the substrate.

An objective of the present teachings is to form the domes without use of adhesive or solvent and as such does not require the use of rollers or sprays when curing the adhesive.

An objective of the present teachings is to allow for the formation of the domed paper as a two-step machinery process wherein the forming of the domes on the flat substrate occurs at a substantially different location after a curing time for the adhesive has elapsed. An objective of the present teachings is to produce a domed paper product suitable in integrity and strength needed for shipping items. An objective of the present teachings is to produce a compostable and recyclable domed paper.

An objective of the present teachings is to make the domes by using equipment capable of operating completely on electrical power.

An objective of the present teachings is to make the domes while allowing for registration of the press and the cut paper domes on the substrate.

A method for forming domes or protruded structures in a flat material such as paper is disclosed. The method includes cutting one or more sheets; applying an adhesive between the one or more sheets, joining the one or more sheets together in a registered manner to form a substrate, encapsulating the one or more sheets in a container to prevent curing of the adhesive, opening the container, and pressing the adhesive under pressure to shape the substrate into a desired shape may include the domes or protruded structures.

Implementations may include one or more of the following features. The method may include winding and rolling one or more of the sheets together. Each of the one or more sheets may be less than 0.01 in thickness. Each of the one or more sheets may include kraft paper. The adhesive may be activated prior to the pressing by applying one or more of a polar solvent, a non-polar solvent, a UV light exposure, heat, or pressure. The pressing may heat the substrate when the substrate is under pressure. The pressing may be performed after a duration greater than a curing time in ambient conditions of the adhesive has elapsed since the applying of the adhesive, and the pressing and the encapsulating may be performed in one location. The pressing may be performed remote from the encapsulating. The applying applies the adhesive in a selective area of the one or more sheets, and the pressing presses the substrate in the selective area. After the pressing, the substrate may be used to package an item to be shipped. The desired shape may include a shape of a phone or a computer. The adhesive may include a starch. The adhesive may have a viscosity between 1000-2000 centipoise (cp). The adhesive may have a viscosity greater than 2000 cp. The method may include applying an ancillary structural component to form an attached structure. The attached structure may include an envelope. The ancillary structural component may include one or more of a snap, an adhesive pull strip, a tag, a grommet, a hook and loop, a handle, or a valving. The cutting may include partially cutting one of the one or more sheets. The cutting may cut one of the one or more sheets less than 50%, less than 75% or less than 100% of a thickness of the one of the one or more sheets.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention, and together with the description serve to explain the principles of the invention.

Figure 1:
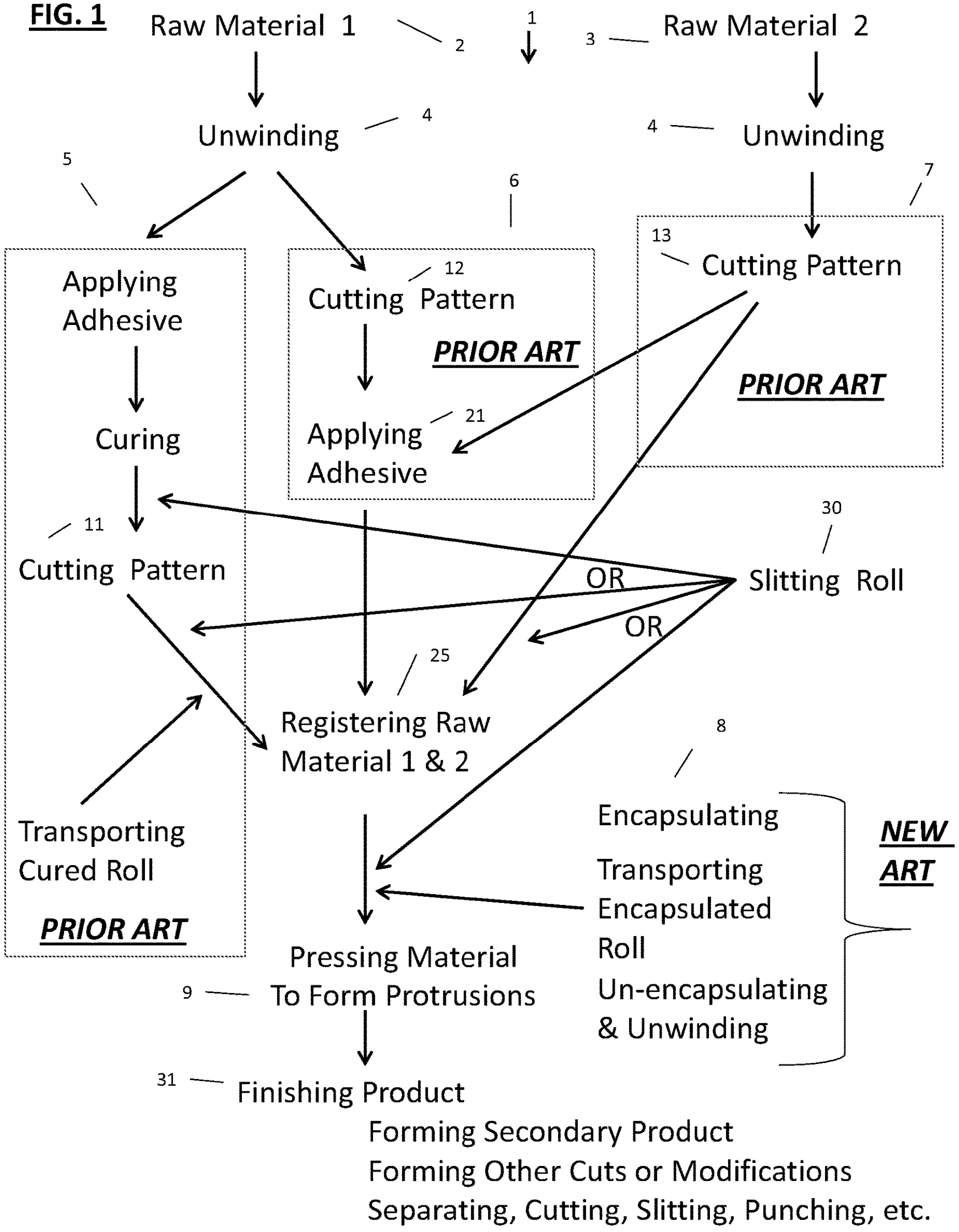
FIG. 1 is a flow diagram of the method used to take one or more master rolls of raw material such as paper and convert them to a finished sheet with domes or protrusions, according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms “a,” “an” and “the” are intended to include the plural forms as well, unless the context clearly indicates otherwise. Furthermore, the use of the terms “a.” “an,” etc. does not denote a limitation of quantity but rather denotes the presence of at least one of the referenced items. The use of the terms “first,” “second,” and the like does not imply any order, but they are included to either identify individual elements or to distinguish one element from another. It will be further understood that the terms “comprises” and/or “comprising”, or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

The present teachings describe a system and method for making a substrate used to form a paper dome. The first step comprises die cutting and combining the paper sheets with an adhesive to form a roll substrate that can be shipped and the second step involves pressing the paper roll substrate under pressure and heat to form the domed bubbles.

In the first step, the adhesive layer is applied between the paper sheets preferably after the registered die cutting of the sheets of paper. The sheets are then pressed within a nip roller to combine the sheets and printing with registration marks is also applied to the paper prior to winding. Registration marks can also be created by cutting the paper.

The wound roll is subsequently placed in a sealed bag or sealed container to prevent air and oxygen from drying the paper and from moisture escaping the bag. In some cases, water in the form of mist may be applied inside the bag or an oxygen scavenging material placed inside the bag.

In some cases the form of the wound roll including the addition of paper sections that would form the exterior of envelopes or boxes and combined with the dome substrate. In these cases, adhesive may also be placed in areas that would form structural components of the ancillary item (for example the sides of an envelope). In addition, straps, handles, peel stick adhesive, grommets, hook and loop fasteners, and other structures may be attached to this base substrate having the unformed domes and further used in a secondary process.

Once closed within the container, the wound substrate roll can be stored and/or shipped to another location for pressing to form the domes. Storage may also be done in a temperature-controlled environment to prevent accelerated curing of the adhesive.

The adhesive used may have a higher viscosity, being recyclable, and compostable and having a high surface tension. Estimate on water content of the ideal adhesive being less than 15% with viscosity of at least 2000 cp. In some embodiments, the adhesive used may have a viscosity between 1000-2000 cp.

In one embodiment, the wound substrate is unwound, and the pressing system registers the die press with the registration marks that correspond to each of the die cut dome sections. The domes are pressed under temperature and pressure.

Integration with ancillary pieces of equipment such as envelope forming machines can also be done and the forming step of the domed paper being done in conjunction with the secondary steps. As an example, the same piece of paper can have one side that has a paper dome substrate and the exterior of an envelope; when folded, the singular construction forming an envelope with adhered sides With the substrate selective forming of the bubbles can also be done so as to form shapes for specific protective packaging; commonly referred to as cavity packs. For example, the exterior silhouette shape of a phone could be domed from the pressing die and the interior could remain flat so as to make a custom held package. In addition, the paper dome substrate can be layered to form a protective package.

Printing on specific areas of the substrate package can be done in the first step such that the deformation caused by the formation of the domes creates a recognizable print.

Factors such as the size, fragility, thermal sensitivity, static sensitivity, shock protection can be selectively chosen to correspond to the area pressed.

Rolls of paper produced off a mill may be 200-300 inches in width. Typical large jumbo rolls used herein are approximately 40,000 feet in length, 24 inches in width, and 50-60 inches in diameter. Common processes involved in converting the master roll include:

- Unwinding
- Rewinding
- Applying an adhesive
- Curing the applied adhesive
- Cutting or kiss cutting a pattern on a layer
- Slitting or sheeting into narrower or smaller rolls
- Registering two sheets
- Transportation of a roll with cured adhesive
- Pressing under pressure, heat, or both to form the domes and protrusions
- Forming the finished product with domes or protrusions
- Forming secondary products made from the domed material
- Forming cuts or other modifications to the domed material or secondary material
- Separating, cutting, slitting, or punching the domed material or secondary material.

As part of the current teachings one or more of the following steps are added:

- Encapsulating of the substrate to prevent hardening.
- Un-encapsulating prior to forming.
- Partially curing to allow for adhesive set time.
- Transportation of the substrate with unhardened glue.
- Cutting or kiss cutting the top and bottom protrusion pattern on the substrate sheets after the adhesive has been applied and the sheets joined.
- Cutting or kiss cutting the top and bottom protrusion pattern on the substrate sheets after the adhesive has been applied and the sheets joined and then immediately pressing the protrusions with the same motion used to cut.
- Forming the protrusions and domes from substrate that has been stored prior to un-encapsulation.

FIG. 1 is a flow diagram of a method 1 used to take one or more master rolls of raw material such as paper and convert them to a finished sheet with domes or protrusions. Raw materials 2 and 3, normally a 40 or 50 lb. kraft paper are unwound from a roll in step 4 and run through a process of cutting a pattern at steps 11, 12, and 13. In step 5 the adhesive is first applied to the raw material and then the adhesive cured and rolled up. This is commonly referred to as "gum paper". The step 5 further described in U.S. Pat. No. 10,870,949 to make the domed paper from a sheet of paper that has dried adhesive and is subsequently moistened. While step 5 of curing the adhesive allows for the dried transport of two cut sheets of material, an activator such as water is required to ensure that bonding occurs when the domes are formed.

Step 6 is described in U.S. Pat. No. 9,315,312 wherein the adhesive step 21 is applied to the raw material 2 and then combined with the cut sheet of step 7 prior to pressing and forming in step 9 and registering in 25 to produce the finished domed paper product for use at step 31. Finishing steps 31 such as forming other products such as envelopes can be done after the pressing or forming other cuts or modifications, or sheeting, cutting, slitting, punching, or creating other products such as lined boxes or bags.

Figure 2:
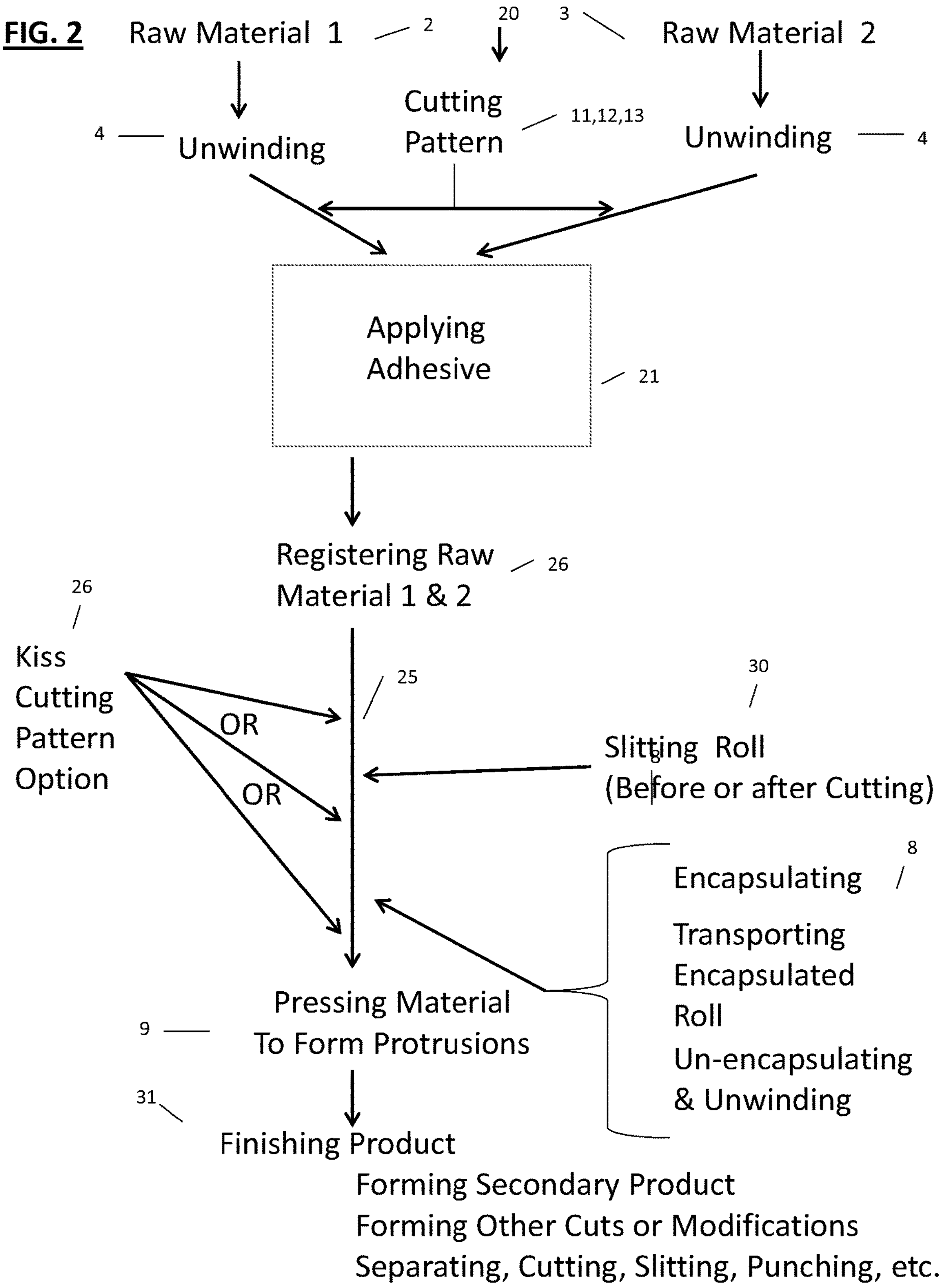
FIG. 2 is a flow diagram of the method used to take one or more master rolls of raw material such as paper and convert them to a finished sheet with domes or protrusions for the purpose of converting product at an end-customer site, according to various embodiments.

FIG. 2 is a flow diagram of a method 20 used to make domed paper per the herein described invention. Raw material 2 and 3 are unwound in 4 and a matched cutting pattern as described as 11, 12, or 13 in FIG. 1 is made. Adhesive is then applied at step 21, normally on one of the to-be-mated sides of the roll 2 or 3 and the materials and cut patterns are then registered prior to being pressed together. In some cases, the cutting at 11, 12, or 13 can be skipped and instead a kiss cutting pattern can be made. This can be done at 9, the time of pressing the domed forms, or at the time of registering the sheets to each other. The kiss cutting pattern being just the depth of one of the sheets and performed so as to not affect the adhered to substrate. In the case that the adhered sheets are formed from a master or jumbo roll, slitting the roll into smaller subsections may be done after the adhesion step but generally prior to the transportation step.

Figure 3:
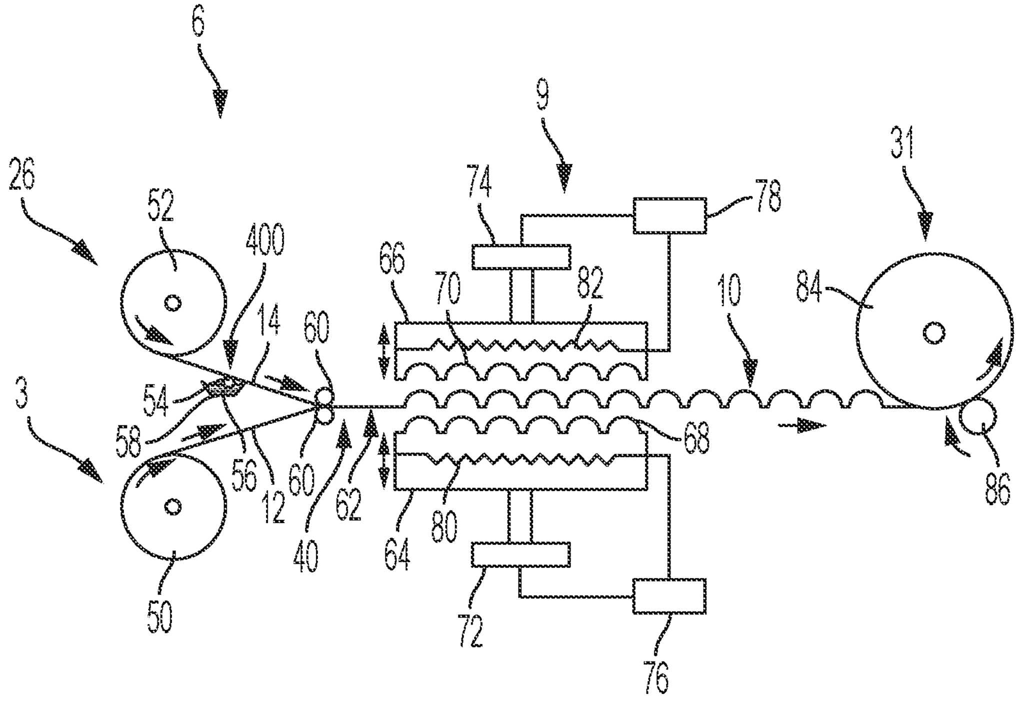
FIG. 3 PRIOR ART
FIG. 3 is a drawing from U.S. Pat. No. 9,315,312 showing a continuous process for forming domed paper for further use in packaging or integrated box or envelope products.

FIG. 3 is a drawing from U.S. Pat. No. 9,315,312 showing a continuous method 6 for forming domed paper starting from a roll of raw material 2 and 3 that have been cut with the appropriate patterns (as in steps 11, 12, or 13 of FIGS. 1 and 2) and then combined in a registered manner at 40 after adhesive application. The press 9 forming the domes and the finished product wound on roll 31. The system shown is very complex for use at an end user site as the application of adhesive at 400 is a difficult task and requires specialized equipment and training.

One of the key features of the present invention is the ability of the substrate to be formed or pressed on site at the place of use or by an end-customer with minimal expertise and easy to use equipment that simply presses. This would generally include an e-commerce facility or other shipping distribution facility but may include construction sites, locations where movers are packing, cold chain distribution facilities including grocery stores, or other sites where high volumes of domed material such as paper are needed. As such, transporting a roll of compacted material is valuable and makes it a viable product to use when shipping is required. The condensed nature of the compressed roll 201 in FIG. 6 makes it very efficient to ship versus the bulkiness of the finished domed paper, which is common for the kinds of materials in the packaging industry. The case of converting at an end-user location is made possible by the use of the appropriate adhesive that can be applied in a large manufacturing setting in a very controlled manner and then curing the adhesive at the end user location. Manufacturing may be performed under ambient conditions, such as, an air temperature of about 60 to 110 degrees Fahrenheit with a humidity level of up to about 90%. Normal curing time for the adhesive under ambient conditions may be between 10 to 120 minutes.

Preferably, a starch-based adhesive is used to allow for the biodegradability of the material. Adhesives that contain high levels of water (greater than 15% by volume) tend to bleed into the fibers of the paper and not allow for a strong bond at the time of pressing. The application of the adhesive via a roller as is done for gum papers is also found to provide an even coating and can be done over large widths versus spraying. Glue thickness ranging from 0.00075" and 0.0015" have been found to maintain a consistent strength between the sheets when cured and viscosity of 1000-3000 centipoise has been ideal. Starch glue that has been heating to the point of browning has been found to provide an ideal medium to use for strength and the glue does not cure when applied to kraft paper and stored in an air free environment. Also the glue does not tend to wick into the fibers of the paper and as such can be stored for significant times when wrapped in an airtight container such as a polyethylene plastic bag. In contrast, starch glues such as wallpaper glues that are white and less viscous, tend to have less strength over time as the adhesive wicks through the paper leaving little bonding strength.

Figure 4A:
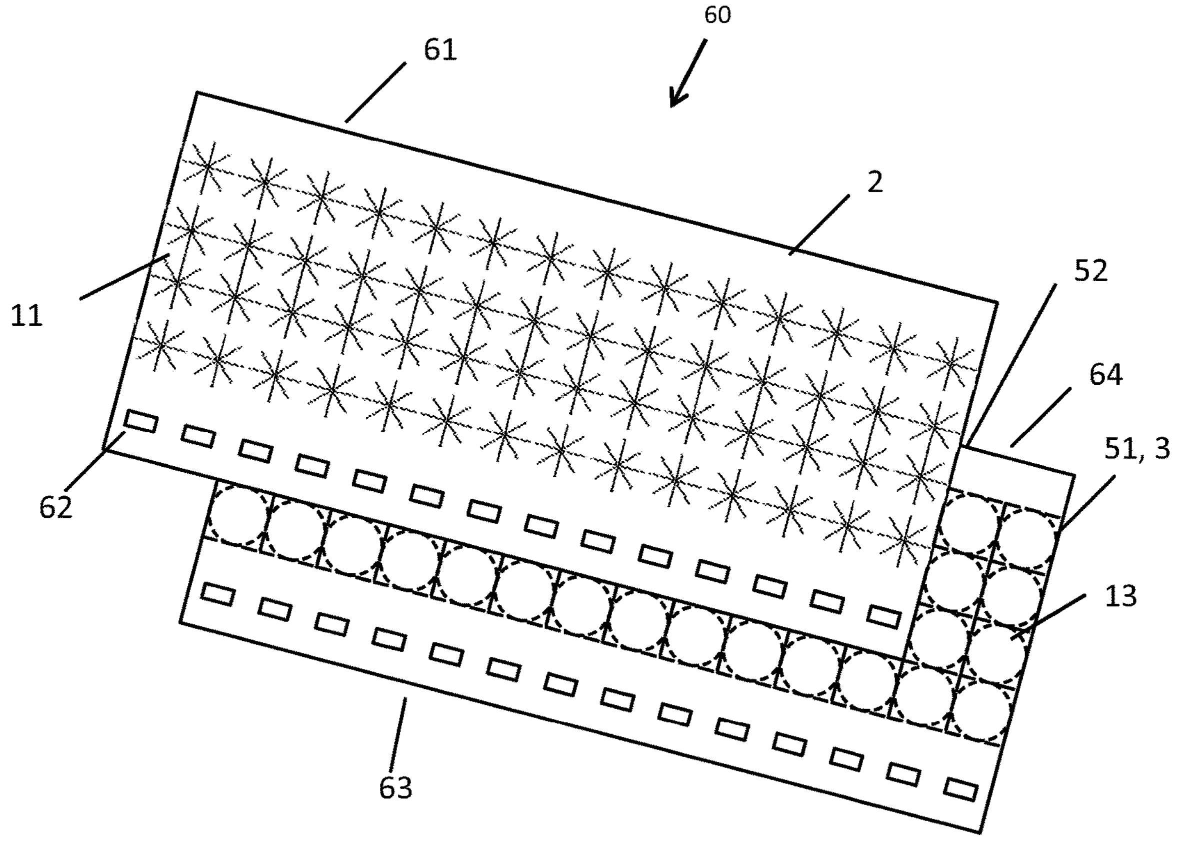
FIG. 4*a* is an isometric view of 2 sheets of material such as paper cut prior to being over laid on each other, according to various embodiments.
Figure 4B:
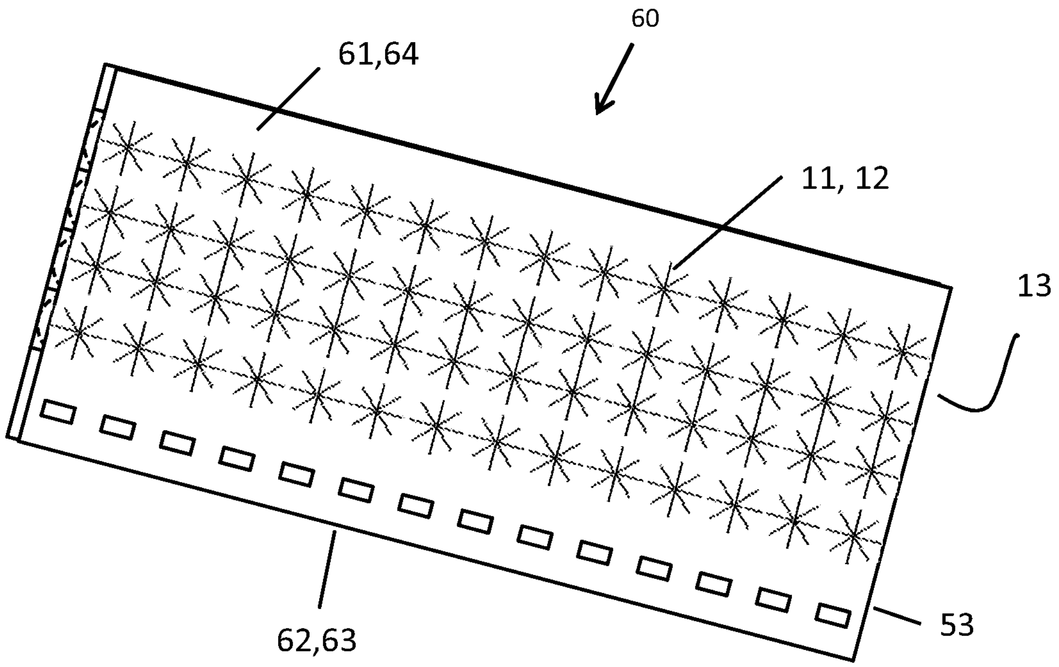
FIG. 4*b* is an isometric view of the sheets from FIG. 4*a* with adhesive placed between them and the sheets pressed and registered together, according to various embodiments.

FIG. 4*a* is an isometric view of material 60 formed with raw material 2 and 3 and cut with pattern 11 and 13 to create sheets 50 and 51 which are pressed to form dome. Edges 61 and 62 are aligned with edges 64 and 63 respectively and adhesive is placed between the sheets at 52. FIG. 4*b* shows the combined sheet 53 with uncured adhesive that is further rolled and then encapsulated prior to transport to the end-use or press location.

Figure 5A:
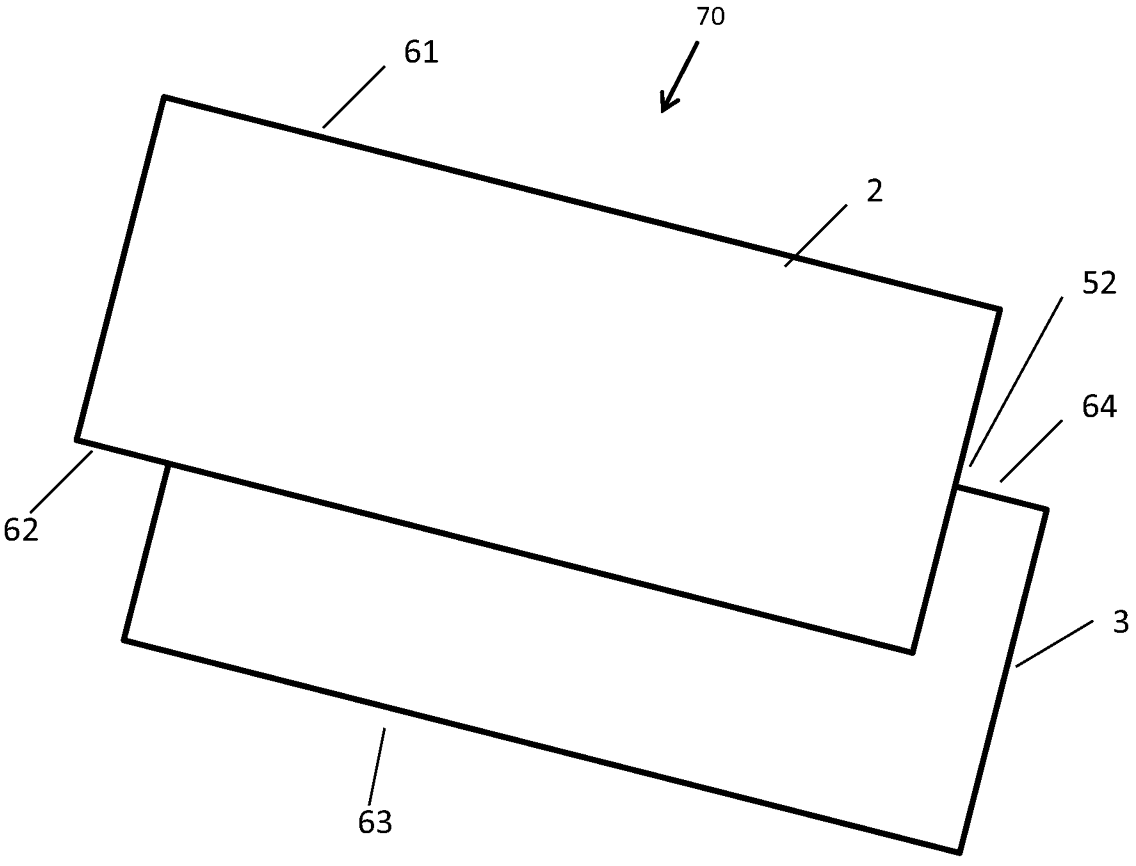
FIG. 5*a* is an isometric view of two sheets of material such as paper prior to being aligned and registered, according to various embodiments.

FIG. 5*a* is an isometric view of material 70 formed with raw material 2 and 3 and not cut with a pattern as in FIGS. 4*a* and 4*b*. Alignment of edges 61 and 62 with edges 64 and 63 respectively is done and adhesive is placed between the sheets at 52. Unlike the product in FIGS. 4*a* and 4*b*, the cutting pattern can be accomplished after alignment using the kiss cutting technique described above and this can be accomplished at the end-use location or at another facility.

Figure 6:
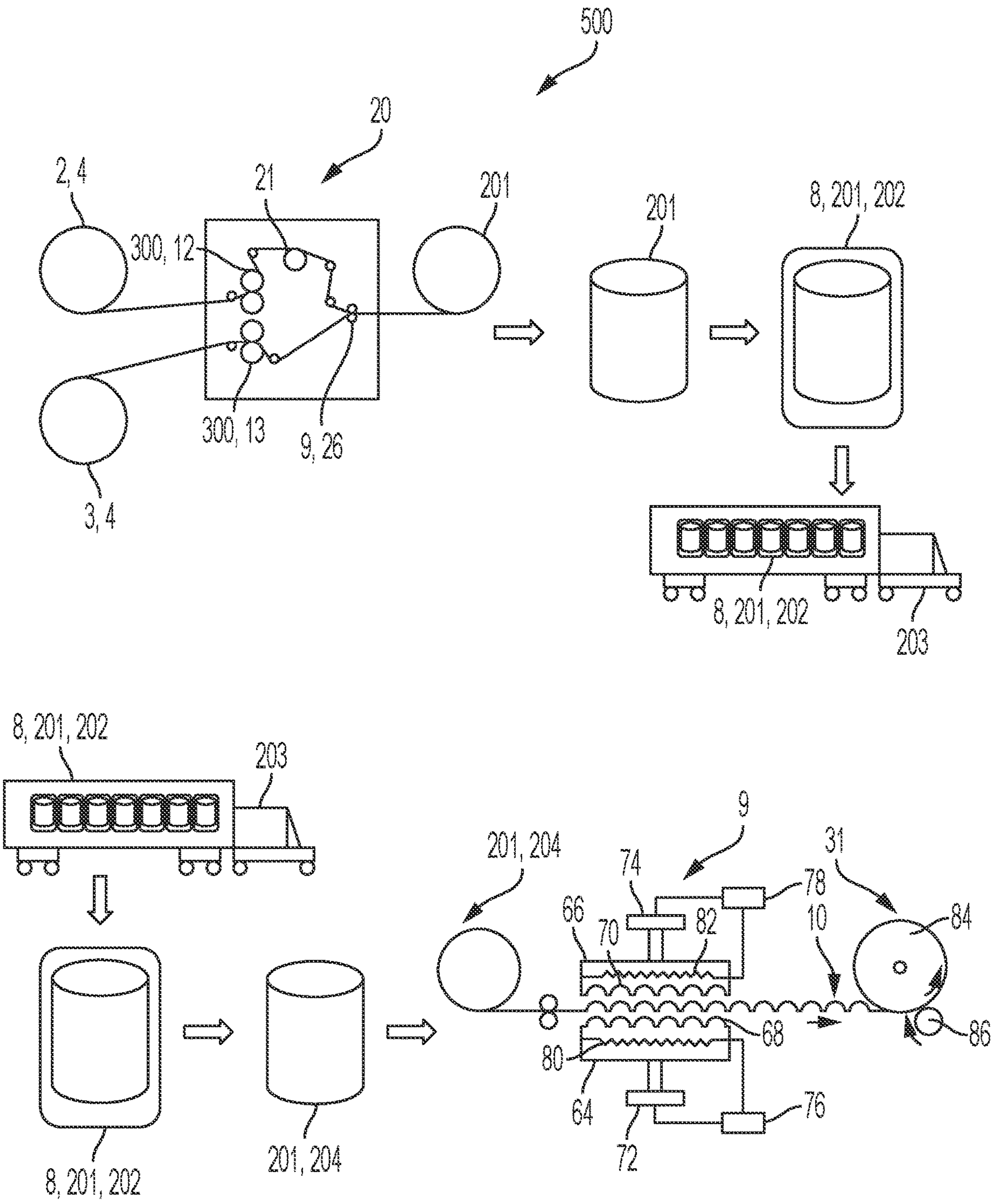
FIG. 6 is a schematic drawing describing the method of making and using the invention herein described including the transport of enclosed rolls of adhered sheets prior to pressing into domes and protrusions at an offsite location, according to various embodiments.

FIG. 6 is a visual diagram of the entire process 500 of forming a roll of sheet such as 60 in FIG. 4*b* with cutting patterns 12 and 13 per the method of FIG. 1 and FIG. 2. Adhesive is placed using application roller 21 and registration at step 9 is done with nip rollers 26. The registration of the sheets upon one another is very important as the glue will otherwise be exposed and stick to the adjacent layer in the roll or to the associated equipment used. Roll 201 is uncured and the roll is encapsulated to prevent drying forming roll 202 per step 8 of FIGS. 1 and 2. The amount of adhesive applied at roller 21 is a function of the speed of the processing and the amount of glue applied as a function of time. Roller systems provided by Glue Machinery Corporation of Baltimore, Maryland can be used to calibrate the ideal speed and thickness of the glue.

Once the roll 201 is encapsulated as 202 it can be transported by 203 such as by rail, truck, airplane, or other means and then un-encapsulated as roll 204. Roll 204 may be partially or completely un-encapsulated at the time of use and then be press in 9 to form finished domed paper in roll 31.

Figure 5B:
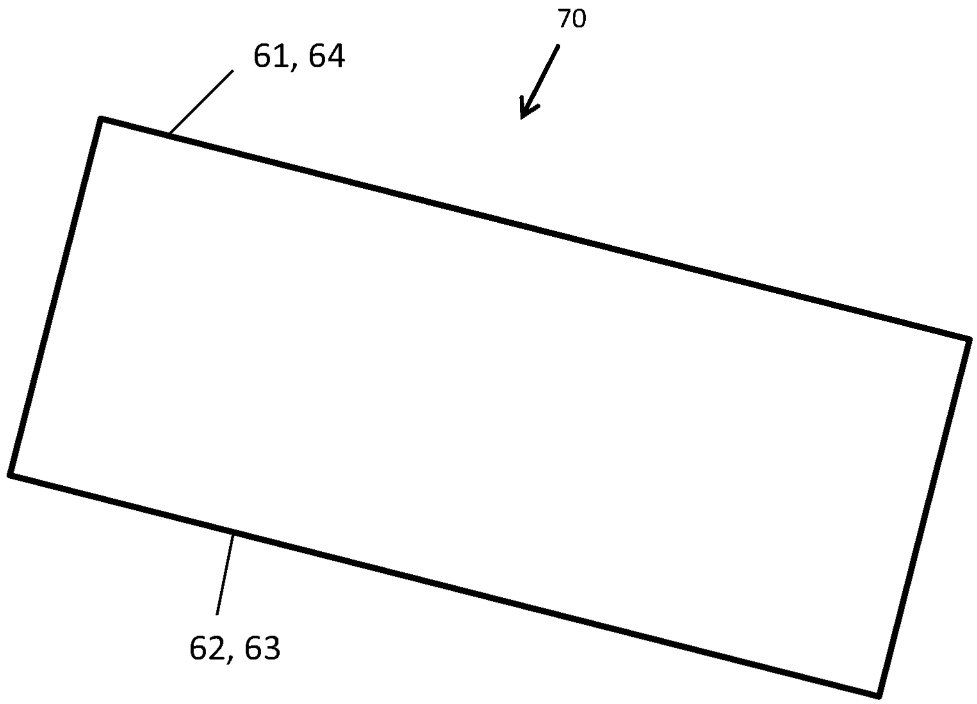
FIG. 5*b* is an isometric view of the sheets from FIG. 6 with adhesive placed between them and the sheets pressed and registered together, according to various embodiments.
Figure 7:
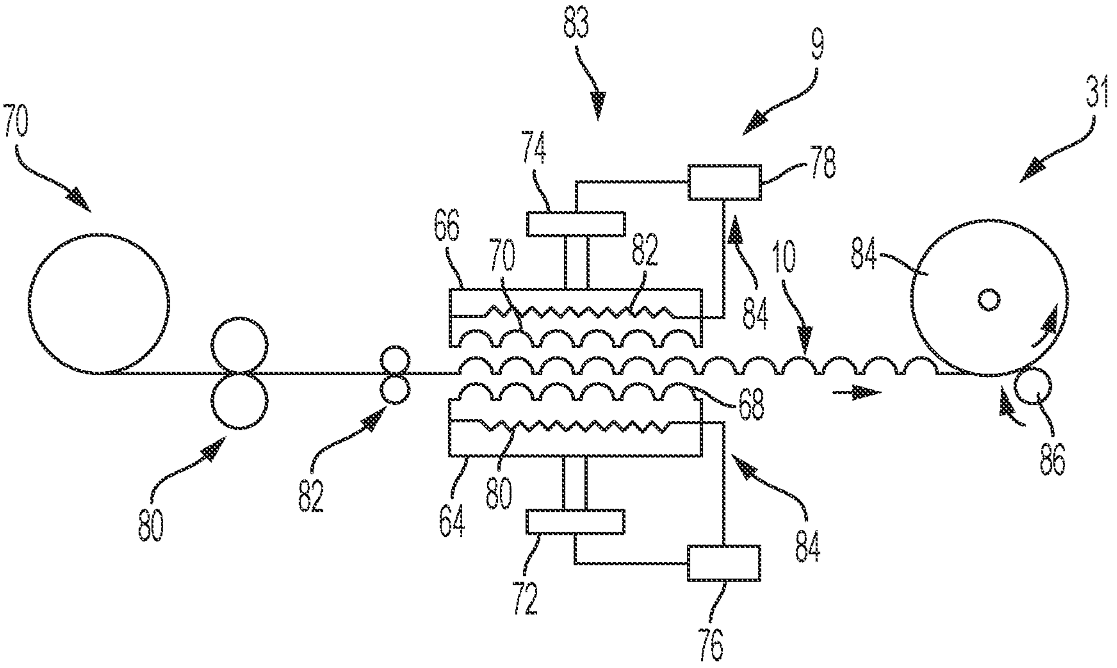
FIG. 7 is a schematic diagram of a machine system intended to kiss cut adhered sheets of material described in FIG. 5*b* to form sheets with domes and protrusions, according to various embodiments.

FIG. 7 is a schematic diagram of a machine system 83 intended to kiss cut adhered sheets 70 of material described in FIG. 5*b* form sheets with domes and protrusions. Flat flexible dies such as those made by Eson CZ are ideal for this application as the thickness of the cut can be adjusted by laser cutting. Rollers 80 cut just into the surface of the exterior layer of paper to form the cut patterns and the nip rollers 82 feeding the paper forward. Press 9 heating the paper with heaters 84 and the system winding the finished roll 31.

Figure 8:
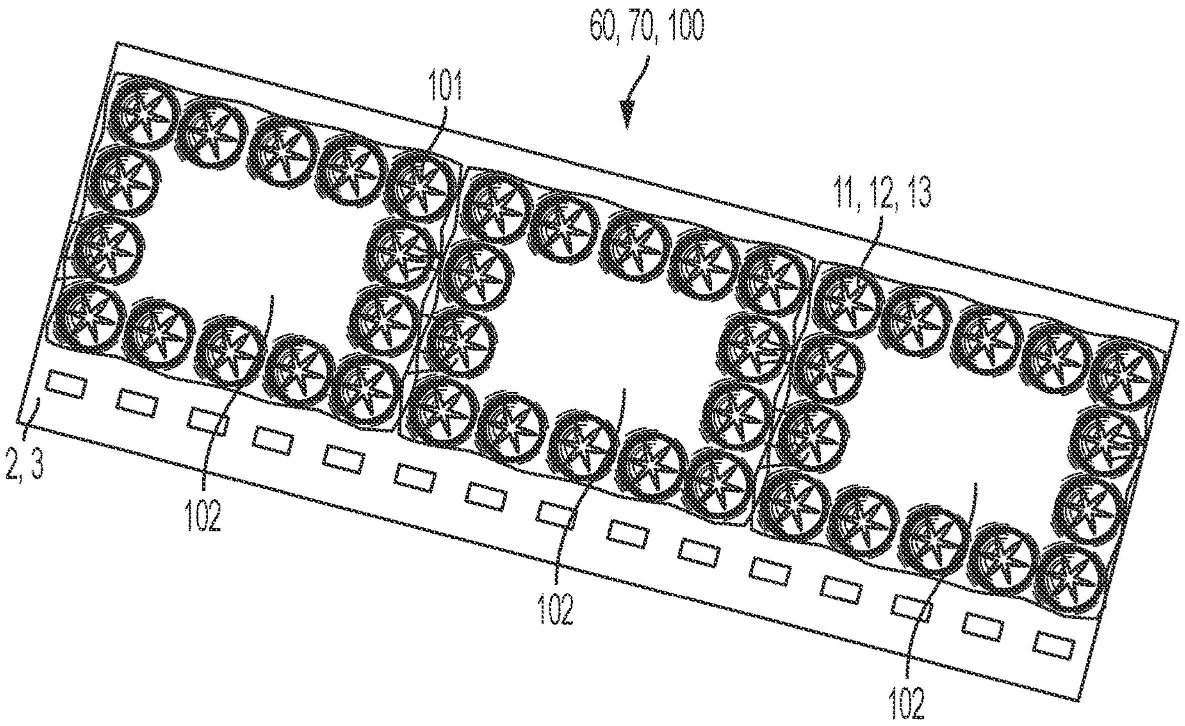
FIG. 8 is an isometric view of package made from selectively forming or pressing different areas of the sheet, according to various embodiments.

FIG. 8 is a sheet of material 60 or 70 (having been kiss cut) and formed from raw material 2 and 3, and is further pressed to produce sheet 100. Domes 101 are selectively pressed into the substrate to form un-domed areas 102 that can form recesses for objects for shipping. In some cases the pre-formed sheet 60 or 70 may have a cut pattern 12, or 13 that avoids cutting into the areas defined by 102 or the cuts may exist and simply not pressed. Such a pressing system could be dynamic and change with the intended object to pack.

The examples presented herein are intended to illustrate potential and specific implementations. It can be appreciated that the examples are intended primarily for purposes of illustration for those skilled in the art. The diagrams depicted herein are provided by way of example. There can be variations to these diagrams or the operations described herein without departing from the spirit of the invention. For instance, in certain cases, method steps or operations can be performed in differing order, or operations can be added, deleted or modified.

What is claimed is:

1. A method for forming domes or protruded structures in a flat material such as paper comprising:

cutting one or more sheets;

applying an adhesive between the one or more sheets;

joining the one or more sheets together in a registered manner to form a substrate; and pressing the adhesive under pressure to shape the substrate into a desired shape comprising the domes or protruded structures, wherein the pressing is performed after a duration greater than a curing time in ambient conditions of the adhesive has elapsed since the applying of the adhesive.

2. The method of claim 1 further comprising winding and rolling one or more of the sheets together.

3. The method of claim 1 wherein each of the one or more sheets is less than 0.01" in thickness.

4. The method of claim 1 wherein each of the one or more sheets comprises Kraft paper.

5. The method of claim 1 wherein the adhesive is activated prior to the pressing by applying one or more of a polar solvent, a non-polar solvent, a UV light exposure, heat, or pressure.

6. The method of claim 1, wherein the pressing heats the substrate when the substrate is under pressure.

7. The method of claim 1 wherein the applying applies the adhesive in a selective area of the one or more sheets, and the pressing presses the substrate in the selective area.

8. The method of claim 1 wherein, after the pressing, the substrate is used to package an item to be shipped.

9. The method of claim 1 wherein the desired shape comprises a shape of a phone or a computer.

10. The method of claim 1 wherein the adhesive comprises a starch.

11. The method of claim 1 wherein the adhesive has a viscosity between 1000-2000 centipoise (cp).

12. The method of claim 1 wherein the adhesive has a viscosity greater than 2000 cp.

13. The method of claim 1 further comprising applying an ancillary structural component to form an attached structure.

14. The method of claim 13 wherein the attached structure comprises an envelope.

15. The method of claim 13 wherein the ancillary structural component comprises one or more of a snap, an adhesive pull strip, a tag, a grommet, a hook and loop, a handle, or a valving.

16. The method of claim 1 wherein the cutting comprises partially cutting one of the one or more sheets.

17. The method of claim 1 wherein the cutting cuts one of the one or more sheets less than 50%, less than 75% or less than 100% of a thickness of the one of the one or more sheets.

18. The method of claim 1 further comprising forming registration marks on one of the one or more sheets in synchronicity with a location of the cutting by one or more of printing, burning, cutting, or pressing.

19. A method for forming domes or protruded structures in a flat material such as paper comprising:

cutting one or more sheets;

applying an adhesive between the one or more sheets;

joining the one or more sheets together in a registered manner to form a substrate;

pressing the adhesive under pressure to shape the substrate into a desired shape comprising the domes or protruded structures; and encapsulating the one or more sheets in a container to prevent curing of the adhesive, wherein the pressing is performed remote from the encapsulating.

* * * * *